US012675209B2

(12) United States Patent　　　　　(10) Patent No.: US 12,675,209 B2
Xu　　　　　　　　　　　　　　　　　　　(45) Date of Patent: Jul. 7, 2026

(54) SCREENSHOT METHOD, TERMINAL, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventor: Weinan Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 682 days.

(21) Appl. No.: 18/057,041

(22) Filed: Nov. 18, 2022

(65) Prior Publication Data

US 2023/0084269 A1　　Mar. 16, 2023

Related U.S. Application Data

(63) Continuation of application No. PCT/CN2021/084400, filed on Mar. 31, 2021.

(30) Foreign Application Priority Data

May 19, 2020　(CN) .......................... 202010422850.6

(51) Int. Cl.
G06F 3/04842　　(2022.01)
(52) U.S. Cl.
CPC ................................. G06F 3/04842 (2013.01)
(58) Field of Classification Search
CPC .. G06F 3/04842; G06F 9/451; G06F 3/04845; G06F 2203/04806

USPC ........................................................ 715/764
See application file for complete search history.

(56) References Cited

U.S. PATENT DOCUMENTS

| | | | |
|---|---|---|---|
| 9,817,484 B2 * | 11/2017 | Geng .................... G06F 3/0484 |
| 10,409,472 B2 | 9/2019 | Lee et al. |
| 2014/0370937 A1 | 12/2014 | Park et al. |
| 2016/0036966 A1 | 2/2016 | Ka et al. |

(Continued)

FOREIGN PATENT DOCUMENTS

| | | |
|---|---|---|
| CN | 104750495 | 7/2015 |
| CN | 104820548 | 8/2015 |

(Continued)

OTHER PUBLICATIONS

EPO, Extended European Search Report for EP Application No. 21808969.6, Oct. 13, 2023.

(Continued)

*Primary Examiner* — Stephen S Hong
*Assistant Examiner* — Broderick C Anderson
(74) *Attorney, Agent, or Firm* — Hodgson Russ LLP

(57) ABSTRACT

A screenshot method, a terminal, and a non-transitory computer-readable storage medium. The screenshot method includes: in response to a start operation, the terminal entering a screenshot state, a display interface of the terminal in the screenshot state comprising a target screenshot interface; in response to a localization operation on the target screenshot interface, determining a first target area according to a display control corresponding to the localization operation on the target screenshot interface; and generating a first target screenshot image according to a content corresponding to the first target area.

15 Claims, 15 Drawing Sheets

(56) References Cited

U.S. PATENT DOCUMENTS

| | | | |
|---|---|---|---|
| 2016/0360085 A1 | 12/2016 | Hisa | |
| 2017/0017366 A1* | 1/2017 | Cho | H04N 21/2743 |
| 2017/0139879 A1* | 5/2017 | Sharifi | G06F 9/453 |
| 2017/0371844 A1* | 12/2017 | Yao | G06F 3/04883 |
| 2019/0147026 A1* | 5/2019 | Jon | G06F 3/04883 |
| | | | 715/230 |

FOREIGN PATENT DOCUMENTS

| | | |
|---|---|---|
| CN | 105739773 | 7/2016 |
| CN | 105843494 | 8/2016 |
| CN | 106293426 | 1/2017 |
| CN | 106598452 | 4/2017 |
| CN | 109213410 | 1/2019 |
| CN | 109460177 | 3/2019 |
| CN | 110231905 | 9/2019 |
| CN | 110456956 | 11/2019 |
| CN | 111641750 | 9/2020 |
| EP | 3220249 | 9/2017 |
| EP | 3537277 | 9/2019 |
| WO | WO-2016197638 A2 * | 12/2016 ............ G06F 3/0487 |
| WO | 2019054534 | 3/2019 |
| WO | 2020063091 | 4/2020 |

OTHER PUBLICATIONS

TIPO, Office Action for TW Application No. 110116091, Dec. 6, 2024.

WIPO, International Search Report and Written Opinion for PCT/CN2021/084400, Jun. 28, 2021.

CNIPA, First Office Action for CN Application No. 202010422850.6, Nov. 12, 2020.

CNIPA, Second Office Action for CN Application No. 202010422850.6, Jun. 10, 2021.

CNIPA, Third Office Action for CN Application No. 202010422850.6, Nov. 18, 2021.

CNIPA, Notification to Grant Patent Right for Invention for CN Application No. 202010422850.6, Apr. 2, 2022.

* cited by examiner

S11

S111

In response to the localization operation, the method may include determining area where a display element corresponding to the first display control is located as the first target area The method may include extracting the display controls from the target screenshot interface, and establishing corresponding relationship between the display controls and display sub-area in the first screenshot image

S11

In response to the localization operation, the method may include determining sub-area corresponding to display control corresponding to position where the localization operation is inputted on the first screenshot image as the first target area

SCREENSHOT METHOD, TERMINAL, AND NON-TRANSITORY COMPUTER-READABLE STORAGE MEDIUM

CROSS REFERENCE TO RELATED APPLICATIONS

The present disclosure is a continuation of International Patent Application No. PCT/CN2021/084400 filed Mar. 31, 2021, which claims priority to Chinese Patent Application No. 202010422850.6 filed May 19, 2020, the entire disclosures of which are incorporated herein by reference.

TECHNICAL FIELD

The present disclosure relates to a field of mobile terminal technologies, in particular to a screenshot method, a terminal, and a non-transitory computer-readable storage medium.

BACKGROUND

With the increasingly powerful performance of mobile terminals such as mobile phones, a user can start to edit some simple pictures on the mobile phones. In social networks, there is often a need for secondary editing after screen capture.

SUMMARY

A screenshot method, a terminal, and a non-transitory computer-readable storage medium are provided in the present disclosure.

The screenshot method of the present disclosure is performed by a terminal, and includes: in response to a start operation, the terminal entering a screenshot state, a display interface of the terminal in the screenshot state including a target screenshot interface; in response to a localization operation on a target screenshot interface, determining a first target area according to a display control corresponding to the localization operation on the target screenshot interface; generating a first target screenshot image according to a content corresponding to the first target area.

The terminal of the present disclosure includes a processor, and the processor is configured to: in response to a start operation, control the terminal to enter a screenshot state, a display interface of the terminal in the screenshot state including a target screenshot interface; in response to a localization operation on a target screenshot interface, determine a first target area according to a display control corresponding to the localization operation on the target screenshot interface; generate a first target screenshot image according to a content corresponding to the first target area.

The non-transitory computer-readable storage medium of the present disclosure includes computer-readable instruction, in response to the computer-readable instruction being implemented by a processor, the processor implements above screenshot method.

BRIEF DESCRIPTION OF THE DRAWINGS

The above and/or additional aspects and advantages of the present disclosure become apparent and easy to understand from the description of embodiments in combination with drawings.

FIG. 10 is a flowchart of a screenshot method according to some embodiments of the present disclosure.

FIG. 11 is a flowchart of a screenshot method according to some embodiments of the present disclosure.

DETAILED DESCRIPTION

Figure 1:
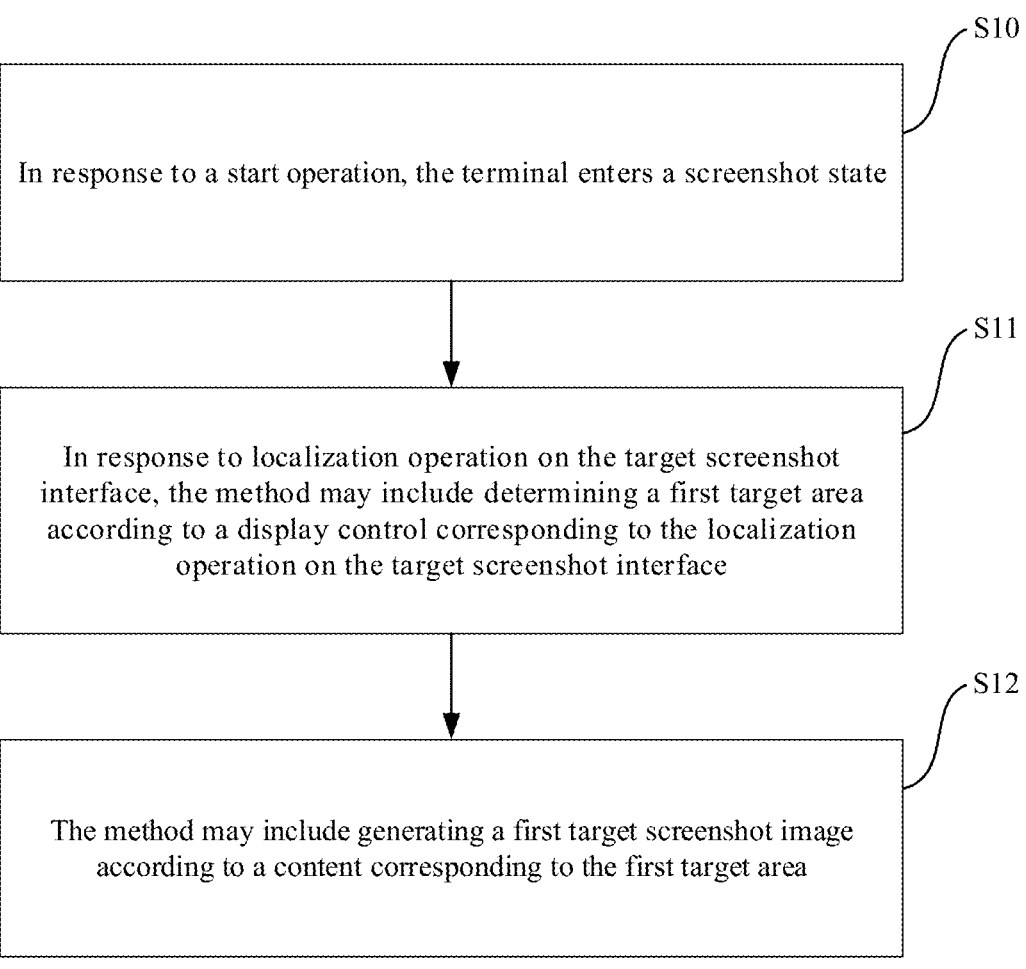
FIG. 1 is a flowchart of a screenshot method of a screenshot image according to some embodiments of the present disclosure.

Embodiments of the present disclosure are described in detail below. Examples of the embodiments is shown in drawings, and same or similar reference labels always represent elements with same or similar structures or functions. The embodiments described below with reference to the drawings are exemplary and are only used to explain the embodiments of the present disclosure, but cannot be understood as restrictions on the embodiments of the present disclosure.

In social networks, there is often a need for secondary editing after screen capture. In relevant arts, it is usually necessary to realize the clipping of screenshot images by using the locators at the top, bottom, left and right directions of the screenshot images for scaling operation. The operation is frequent and not accurate enough.

A screenshot method of the present disclosure is performed by a terminal, and includes: in response to a start operation, the terminal entering a screenshot state, a display interface of the terminal in the screenshot state including a target screenshot interface; in response to a localization operation on the target screenshot interface, determining a first target area according to a display control corresponding to the localization operation on the target screenshot interface; generating a first target screenshot image according to a content corresponding to the first target area.

In some embodiments, in the screenshot state, in the screenshot state, there is a corresponding relationship between display controls and some or all elements in the display interface of the terminal.

In some embodiments, the in response to localization operation on a target screenshot interface, determining a first target area according to a display control corresponding to the localization operation on the target screenshot interface includes: in response to the localization operation, determining a first display control, and determining area where a display element corresponding to the first display control is located as the first target area.

In some embodiments, the screenshot method may further include: in response to the localization operation, the display controls is set as units in a hover state, setting area corresponding to the display controls as the selectable state in the current state interface, a user selects the target screenshot interface one by one through clicking to determine the first target area; the area corresponding to the display controls being selected by default; and the user unselects the area corresponding to the all display controls through invert selection.

In some embodiments, the screenshot method may further include: in response to the localization operation, the display controls are set as units in a hover state, directly setting area corresponding to the display controls as the first target area, and generating a screenshot image sequence corresponding to each of the first target area, a user selects and stitches one or more target image to generate the target screenshot image In some embodiments, the in response to the start operation, the terminal entering a screenshot state includes: in response to the start operation, the terminal entering the screenshot state; generating and displaying a first screenshot image in the target screenshot interface.

In some embodiments, before the in response to localization operation on a target screenshot interface, determining a first target area according to a display control corresponding to the localization operation on the target screenshot interface includes: extracting display controls from the target screenshot interface, and establishing corresponding relationship between the display controls and display sub-area in a first screenshot image.

In some embodiments, the in response to localization operation on a target screenshot interface, determining a first target area according to a display control corresponding to the localization operation on the target screenshot interface includes: in response to the localization operation, determining sub-area corresponding to display controls corresponding to position where the localization operation inputted in the first screenshot image as the first target area.

In some embodiments, after the in response to localization operation on a target screenshot interface, determining a first target area according to a display control corresponding to the localization operation on the target screenshot interface includes: highlighting the first target area.

In some embodiments, the generating a first target screenshot image according to the content corresponding to the first target area includes: in response to the first target area being inputted, generating an editing interface of a screenshot image; in response to first operation on the editing interface of the screenshot image, generating the first target screenshot image according to the first target area.

In some embodiments, the method further includes: in response to second operation on the editing interface of the screenshot image, expanding the first target area to second target area corresponding to parent control of the display controls.

In some embodiments, the method further includes: in response to third operation on the editing interface of the screenshot image, narrowing expanded second target area to the first target area.

A terminal 100 including a processor 20 is provided in the present disclosure, and the processor 20 is configure to: in response to a start operation, control the terminal to enter a screenshot state, a display interface of the terminal in the screenshot state including a target screenshot interface; in response to localization operation on a target screenshot interface, determine a first target area according to a display control corresponding to the localization operation on the target screenshot interface; generate a first target screenshot image according to the content corresponding to the first target area.

In some embodiments, the processor 20 is configure to: in response to the localization operation, determine area where a display element corresponding to the first display control is located as the first target area.

In some embodiments, the processor 20 is configure to: in response to the start operation, control the terminal to enter the screenshot state; generate and display a first screenshot image in the target screenshot interface.

In some embodiments, the processor 20 is configure to: extract display controls from the target screenshot interface, and establish corresponding relationship between the display controls and display sub-area in a first screenshot image.

In some embodiments, the processor 20 is configure to: in response to the localization operation, determine sub-area corresponding to display controls corresponding to position where the localization operation inputted in the first screenshot image as the first target area.

In some embodiments, the processor 20 is configure to: highlight the first target area.

In some embodiments, the processor 20 is configure to: in response to the first target area being inputted, generate an editing interface of a screenshot image; in response to first operation on the editing interface of the screenshot image, generate the first target screenshot image according to the first target area.

A non-transitory computer-readable storage medium 200 including computer-readable instruction. In response to the computer-readable instruction being implemented by a processor 300, the processor 300 implements any one of above screenshot methods.

Figure 2:
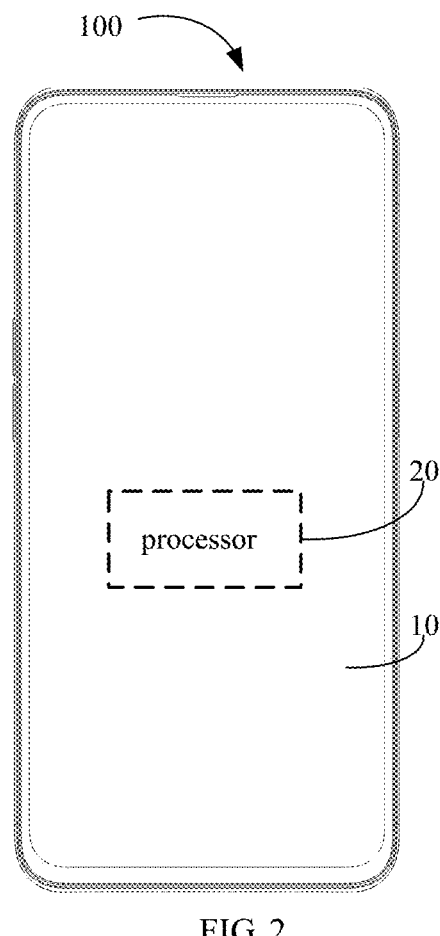
FIG. 2 is a structural schematic view of a terminal according to some embodiments of the present disclosure.
Figure 3:
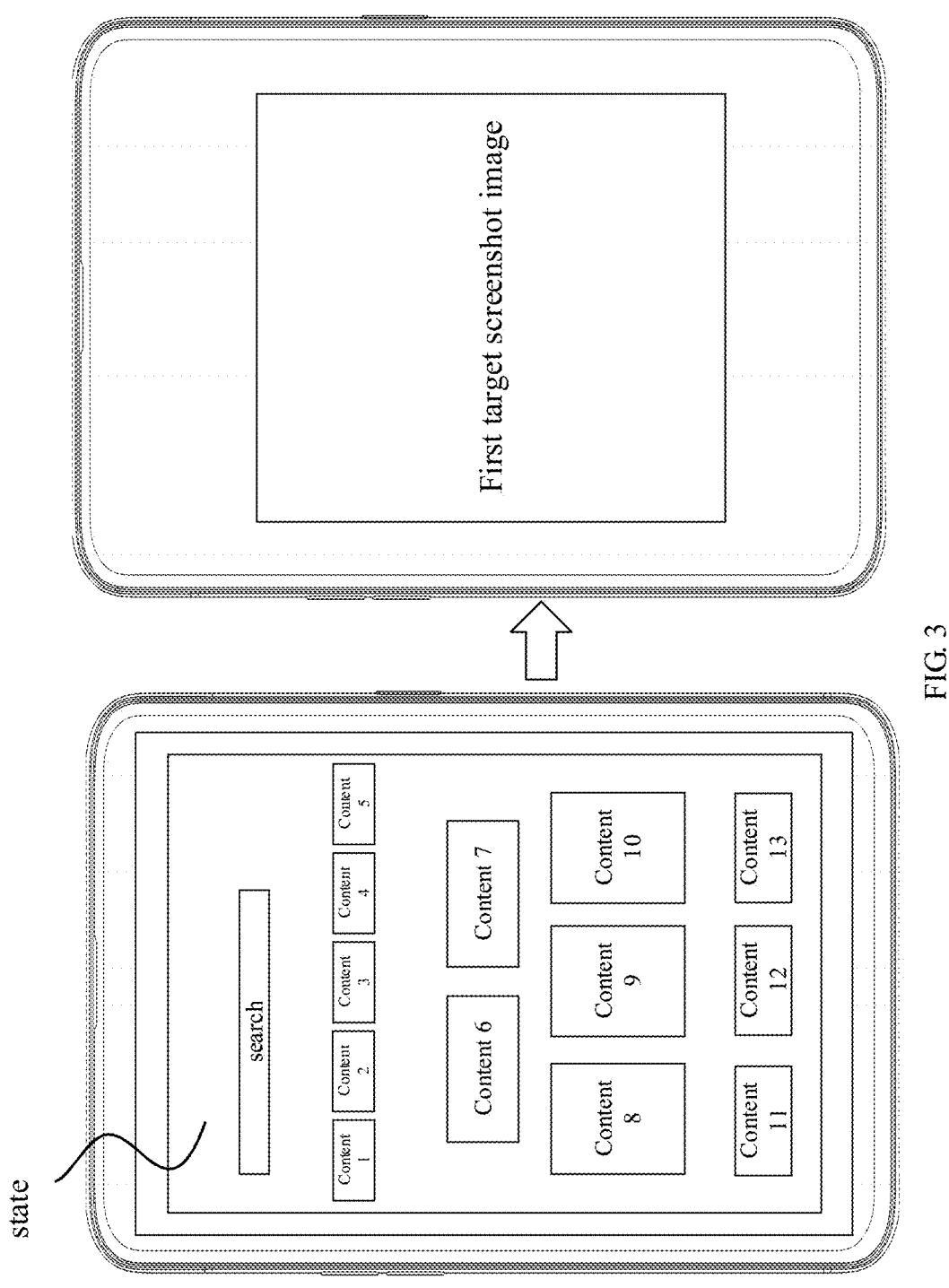
FIG. 3 is a scene schematic view of a screenshot method according to some embodiments of the present disclosure.

As shown in FIGS. 1 to 3, the screenshot method performed by the terminal is provided, and may include following operations.

At operation S10, in response to the start operation, the terminal enters the screenshot state.

At operation S11, in response to the localization operation on the target screenshot interface, the method may include determining the first target area according to the display control corresponding the localization operation inputted on the target screenshot interface.

At operation S12, the method may include generating the first target screenshot image according to the content corresponding to the first target area.

A terminal 100 is provided in the present disclosure. The terminal 100 may include a display 10 and a processor 20. The operations S10 to S12 may be implemented by the processor 20. That is to say, the processor 20 may be configured to control the terminal 100 to enter the screenshot state in response to the start operation, determine the first target area according to the display control corresponding the localization operation inputted on the target screenshot interface in response to the localization operation on the target screenshot interface, and generate the first target screenshot image according to the content corresponding to the first target area.

The terminal 100 may be a mobile phone, a tablet, a smart wearable device (a smart watch, a smart bracelet, a smart helmet, a smart glass, etc.), a virtual reality device, a head display device, etc. The mobile phone is taken as example to describe in the present disclosure, but the terminal 100 includes but not limits to the mobile phone.

The start operation is an operation triggering a screenshot event. For example, in practical operation, the user may click a screenshot instruction in a drop-down notification bar to trigger the screenshot event or trigger the screenshot event through a shortcut gesture instruction. The screenshot may include capturing a content in current screen, long screenshot, and scrolling screenshot, which is no limited herein.

The screenshot state is a display interface in the display of the terminal 100 after the screenshot event is triggered.

The screenshot image is an image file generated by the user inputting an instruction of capturing a current display content.

A screenshot function is a usual function of the mobile phone. A screenshot method in related art is: capturing whole current display interface in a display of a mobile phone, and storing the whole current display interface as picture format. However, there always includes a plurality of display elements, plates, or windows. The user may only need to capture part of the display interface. In related art, the screenshot method includes: first capturing an image of whole display interface, then performing expanding or narrowing operation by positioners set on four apex angle and/or four sides of the screenshot image, finally localizing a target area and achieving the screenshot of the target area. One the one hand, operations of the screenshot method in related art is complicated. On the other hand, the target area cannot be accurately captured when the display displays a plurality of display elements. For example, non-target content may be captured in the target area.

In the screenshot method of the present disclosure, after a screenshot operation is triggered, the terminal 100 enters the screenshot state. The screenshot state is a hover state of the terminal interface. In the hover state, a corresponding relationship between the display elements in interface and the display controls is retained, but page jump corresponding to the display controls is not triggered in response to clicking the display elements. For example, as shown in page of FIG. 5, a corresponding relationship between contents 1 to 13 and display controls enable a display area corresponding to a display control to be directly determined by selecting the display control, but page jump corresponding to the display control is not performed in response to clicking content. For example, when the page is product page and content 1 correspond to product A, in the hover state, jumping to a detail page of the product A not be performed in response to clicking the content 1.

Alternatively, the screenshot state is a state that a whole image in current interface is directly captured and wait to be further edited to generate the target screenshot after the screenshot operation is triggered.

After entering the screenshot state, the user inputs the localization operation to the target screenshot interface.

Specifically, the user may select the target area they want to crop. For example, in practical operation, the user may input long press operation to an area of the display interface to select the target screenshot interface. It should be understood that, compared to click operation, the long press operation can avoid mistake trigger through long input duration.

Further, localizing corresponding display control in the display according to position of the localization operation, and determining area where the corresponding display control in located as the first target area. That is, in the screenshot state, a position where the user inputs long press operation to the interface is the target screenshot interface, display area corresponding to the display control corresponding to the position will be determined as the first target area, then user interface prompts cropping area through identification, such that the user can continue to operate the first target area such as input long press operation, and the terminal display interface will be cropped as the first target area, i.e., the area where the display control is located.

Further, the user interface may be set operation options such as ok option, cancel option, expand option, and narrow option. Specifically, when the user selects ok option, current first target area is determined and corresponding first target screenshot image is generated. When the user selects cancel option, the first target area is cancelled selecting and return to previous operation to reselect the first target area. When the user selects expand option, the selected first target area can be expanded. When the user selects narrow option, the current selected first target area can be narrowed. Of course, the operation options include but not limited to examples in the present disclosure, which is not limited herein.

The screenshot method in the present disclosure does not need to manually adjust cropping area through the positioner, but determines the cropping area according to elements or display controls corresponding to the target screenshot in the terminal interface in the screenshot state interface, thereby quickly capturing an area of the display and improving cropping efficiency and accuracy of the screenshot image. Experience of the user is good.

In some embodiments, in the screenshot state, there is a corresponding relationship between some or all the display elements and the display controls.

Specifically, in soft level, the display elements the display interface may be displayed in form of the display controls. As for the user, the display may include a plurality of different display area displaying contents. The display controls may correspond to the some or all the display elements in the display interface. In this embodiment, the display interface of the terminal 100 in the screenshot state may be in a user-operable state, and the display elements in the display interface may be displayed in form of the display controls. That is, the terminal 100 in the screenshot state may include a plurality of display controls. It should be understood that, the display area where the first target area is located may correspond to at least one display control.

Figure 4:
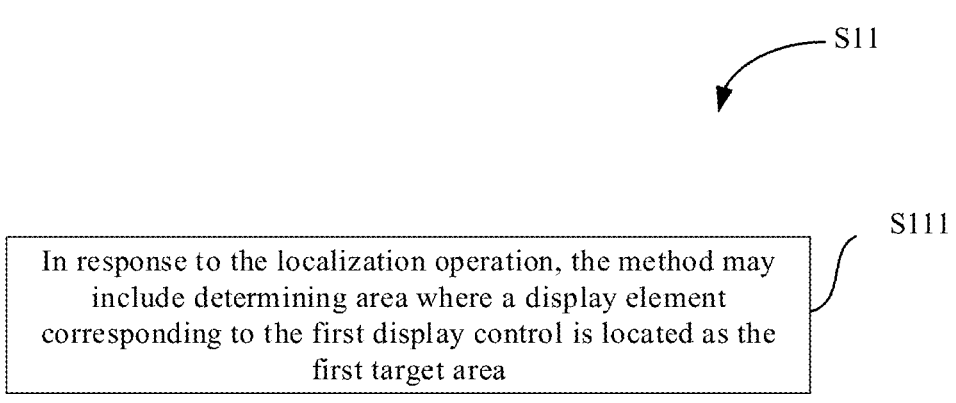
FIG. 4 is a flowchart of a screenshot method according to some embodiments of the present disclosure.

As shown in FIG. 4, in some embodiments, operation S11 may include follow operations.

At operation S111, in response to the localization operation, the method may include determining the first display control according to the localization operation, and determining area where the display element corresponding to the first display control is located as the first target area.

In some embodiments, the operation S111 may be implemented by the processor 20. That is, the processor may determine the first display control according to the localization operation, and determine the area where the display element corresponding to the first display control is located as the first target area.

Figure 5:
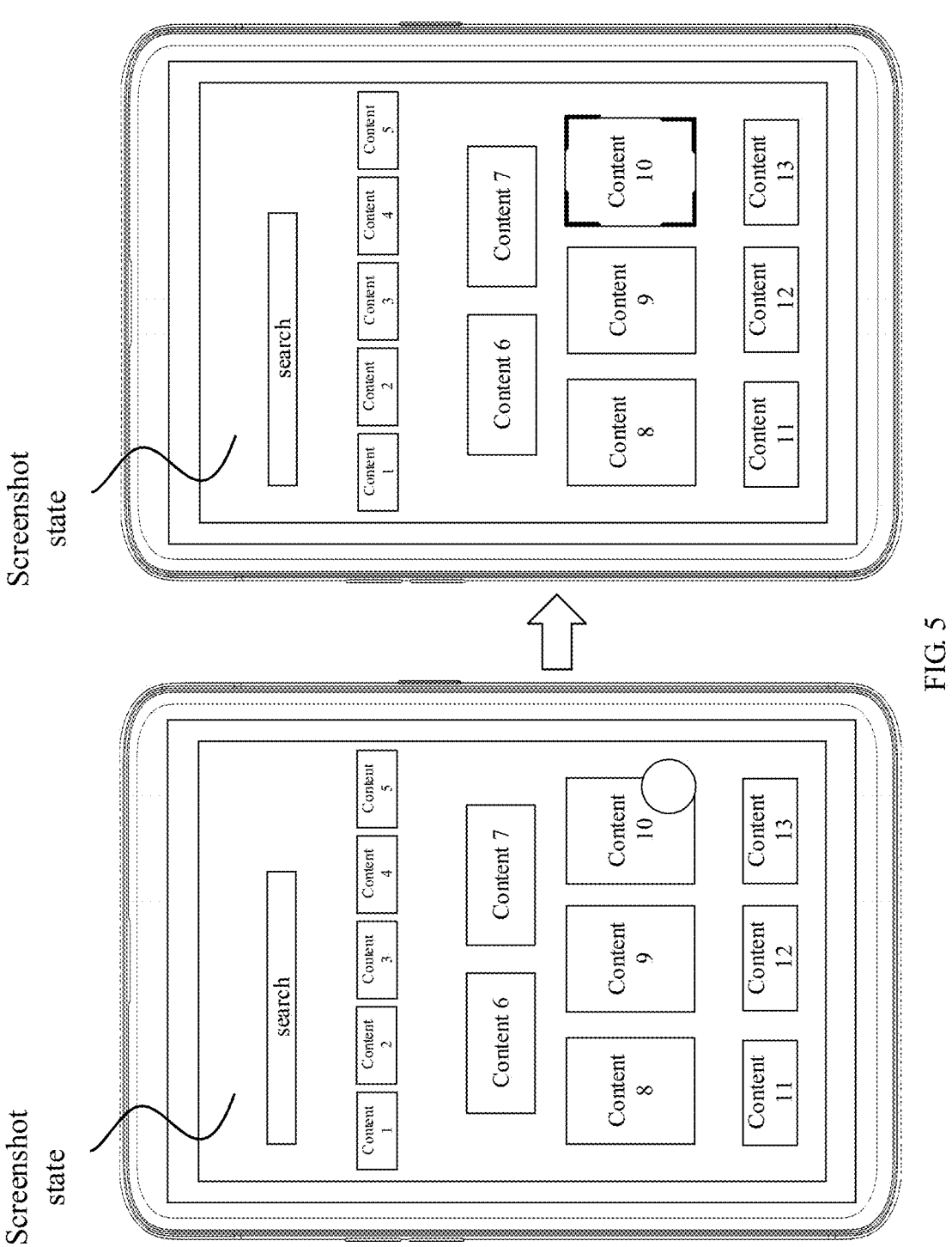
FIG. 5 is a scene schematic view of a screenshot method according to some embodiments of the present disclosure.

Specifically, as shown in FIG. 5, in the screenshot state, the terminal display interface may be in the hover state that the user can operate, after the localization operation is inputted on the target screenshot interface, i.e., the first display control corresponding to the target screenshot interface is selected through the localization operation, the first target area may be determined by the area where the display element corresponding to the first display control is located.

The localization operation may include long press operation by single-finger or multiple-finger, which is not limited herein. The localization operation is used to differentiate from the common click operation to avoid determining the cropping area because of the mistake trigger. The user may input the localization operation to the target screenshot interface, and determine range of the first target area according to the area where the element corresponding to the first display control related to the position of the localization operation is located. After the first target area is determined in response to the localization operation, border of the first target area may be set to notice the user in form of border line. After the user inputs confirmation operation, the first target area is determined. The confirmation operation may be the long press operation by single-finger or multiple-finger, which is not limited herein. Of course, user interaction window may be display in display interface of first target screenshot image, the user may confirm or cancel by clicking in the window. After selected area is determined as the cropping area, area apart from the cropping area in the current interface may be performed obfuscation to highlight the cropping area.

Figure 6:
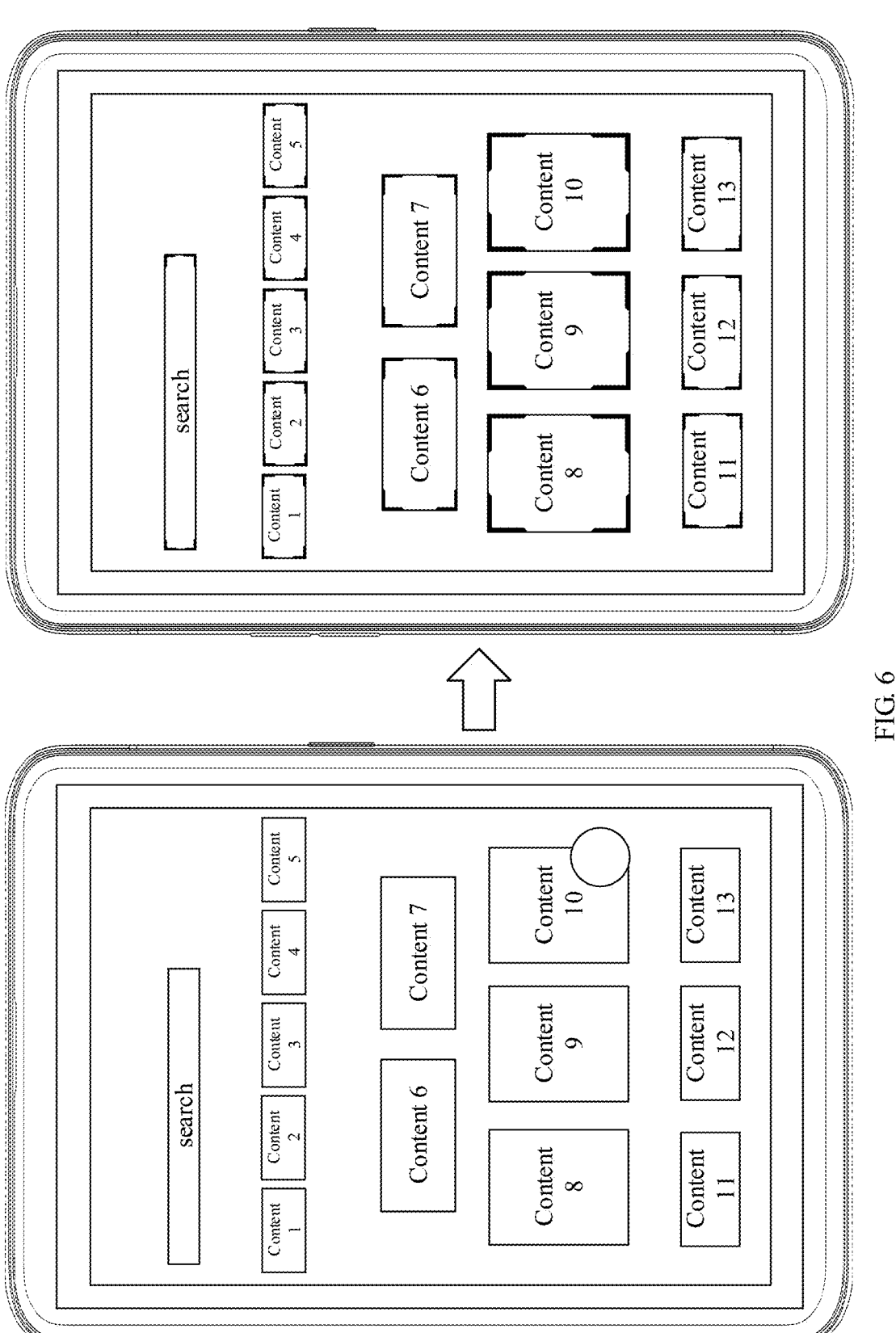
FIG. 6 is a scene schematic view of a screenshot method according to some embodiments of the present disclosure.

As shown in FIG. 6, in some embodiments, in response to the localization operation, the display controls may be set as units in the hover state, the area corresponding to the all display controls may be set as the selectable state in the current state interface, the user can select the target screenshot interface one by one through clicking, thereby determining the final first target area. The area corresponding to the all display controls may be selected by default. Alternatively, the user may unselect the area corresponding to the all display controls through invert selection.

Figure 7:
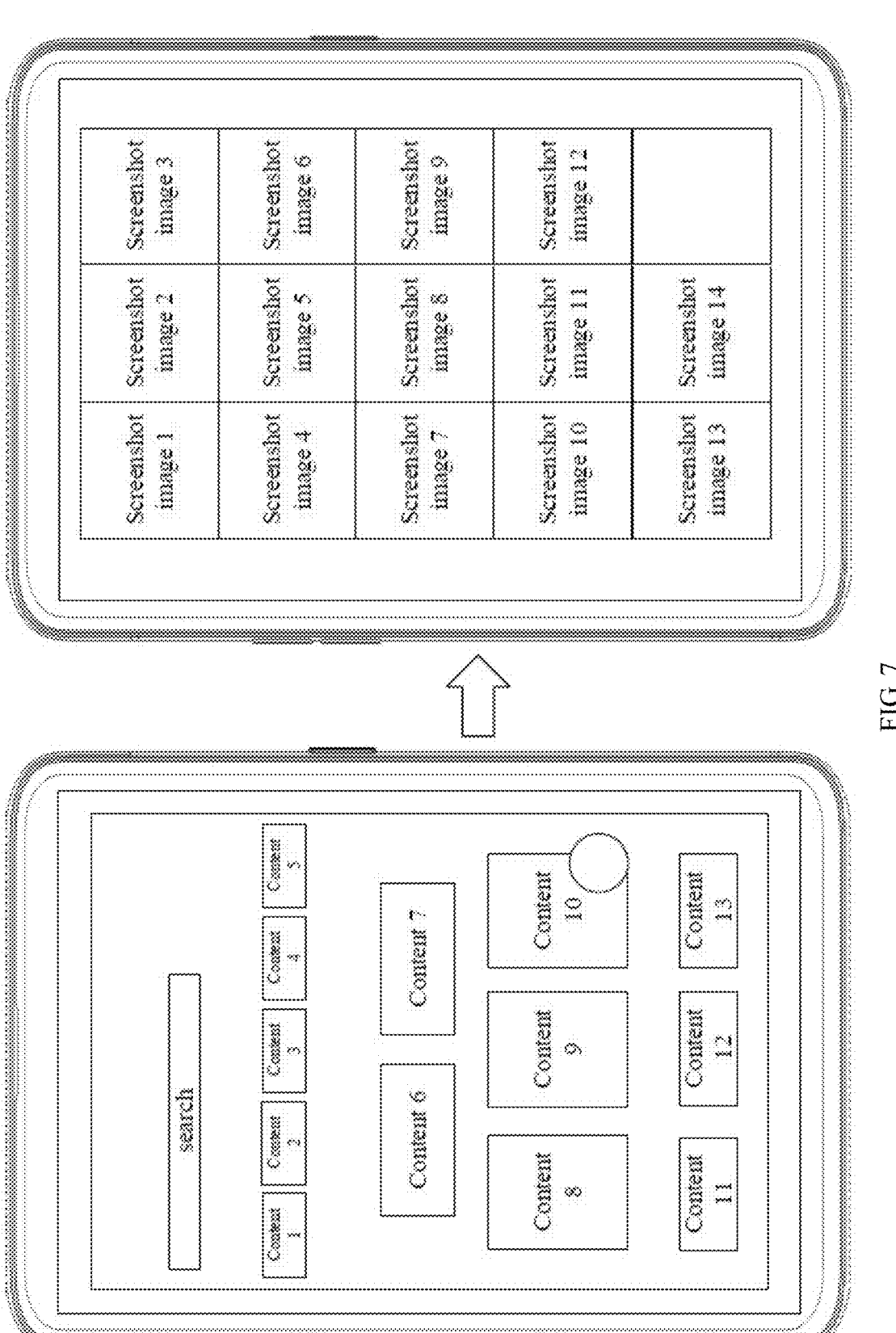
FIG. 7 is a scene schematic view of a screenshot method according to some embodiments of the present disclosure.

As shown in FIG. 7, in some embodiments, in response to the localization operation, the display controls may be set as units in the hover state, area corresponding to the all display controls may be directly set as the first target area, and the screenshot image sequence corresponding to each of the first target area may be generated, such that the user can select and stitch one or more the target image to generate the final target screenshot image.

Figure 8:
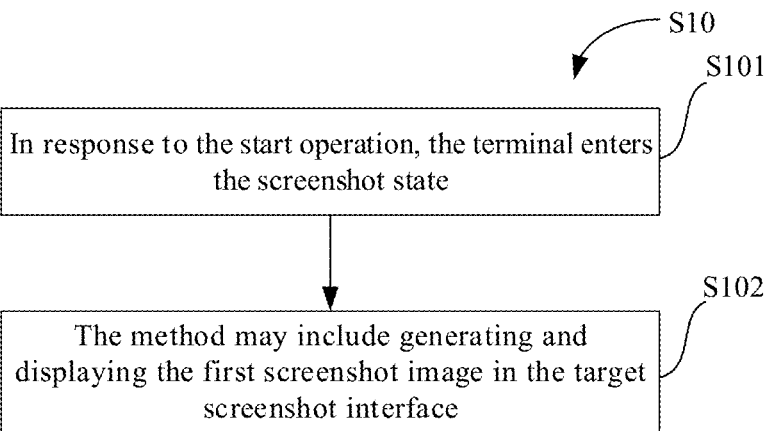
FIG. 8 is a flowchart of a screenshot method according to some embodiments of the present disclosure.

As shown in FIG. 8, in some embodiments, operation S10 may include following operations.

At operation S101, in response to the start operation, the terminal enters the screenshot state.

At operation S102, the method may include generating and displaying the first screenshot image in the target screenshot interface.

In some embodiment, operations S101 and S102 may be implemented by the processor 20. That is to say, the processor 20 is configured to control the terminal 100 to enter the screenshot state through the start operation, and generate and display the first screenshot image in the target screenshot interface.

Figure 9:
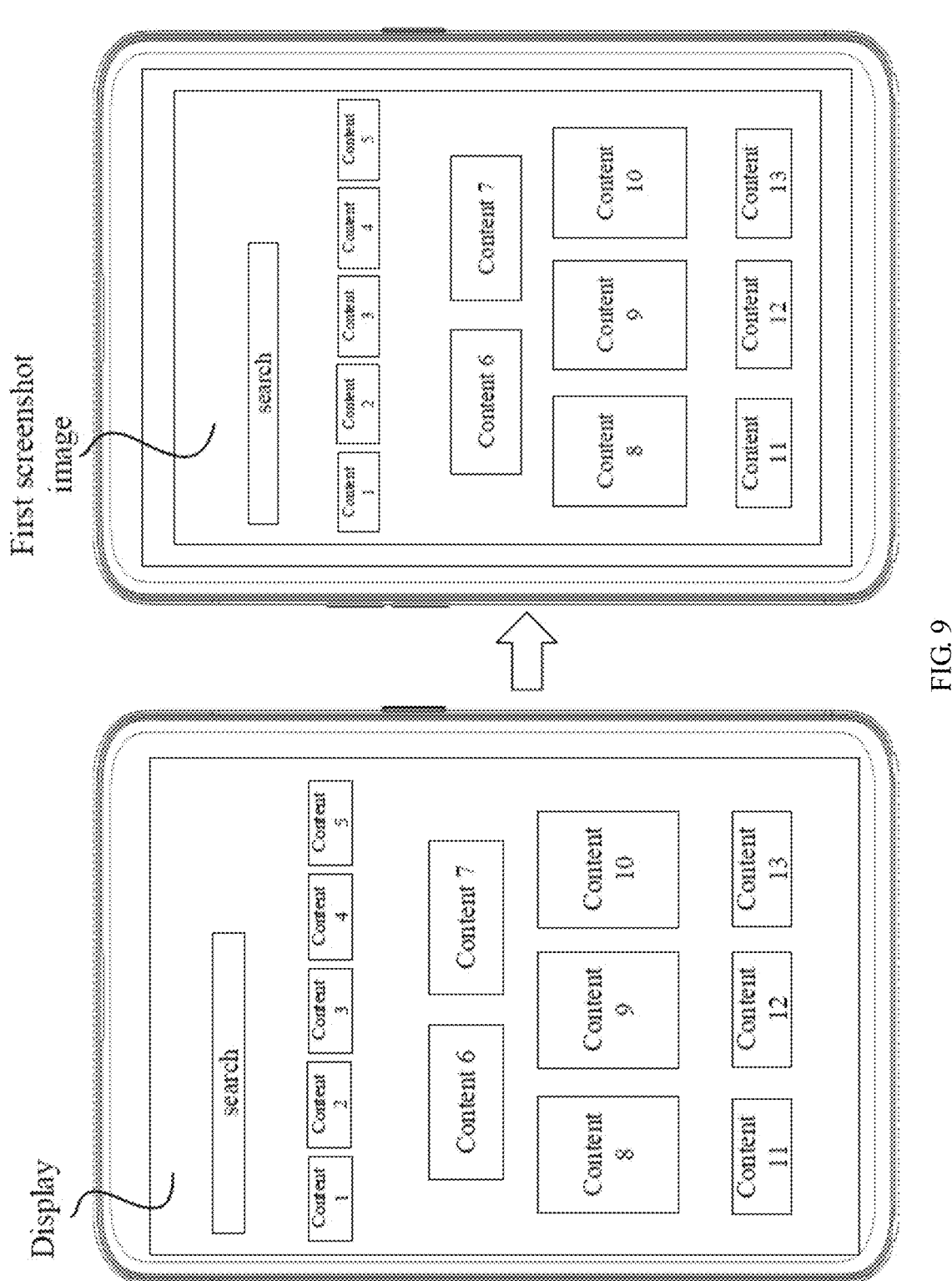
FIG. 9 is a scene schematic view of a screenshot method according to some embodiments of the present disclosure.

Specifically, as shown in FIG. 9, in this embodiment, compared to above hover state in the screenshot state, the display interface of the terminal 100 in the screenshot state may be an image captured and generated in the target screenshot interface. That is to say, the display may display an image of current display content for the user. The target screenshot interface may include the first target area. It should be understood that, the localization operation on the target screen interface by user may interact with images instead of the state interface.

As shown in FIG. 10, in some embodiments, operations performed before operation S11 may include following operations.

At operation S112, the method may include extracting the display controls from the target screenshot interface, and establishing corresponding relationship between the display controls and display sub-area in the first screenshot image.

In some embodiments, operation S112 may be implemented by the processor 20. That is to say, the processor 20 may be configured to extract the display controls from the target screenshot interface, and establish the corresponding relationship between the display controls and display sub-area in the first screenshot image.

Specifically, in this embodiment, the display controls may be extracted from the target screenshot interface, the display controls may be set as the minimum display units, the first screenshot image and the display controls may be established the corresponding relationship. More specifically, the display sub-area in the first screenshot image may be established with the display controls. In this way, although the first screenshot image is not state interface, input operation is still established dynamic relationship with the display sub-area. When the user hopes to capture the target area, after the terminal 100 enters the screenshot state, the user can long press any position of the display sub-area in the screenshot image, such that the display sub-area may be relevant to the area where the display elements corresponding to the display controls located through the corresponding relationship between the display sub-area and the display controls, thereby determining the first target area instead of the user uses the positioners to manually adjust size of the target screenshot interface. In addition, since the cropping area corresponds to the area determined by the display controls, border of the cropping area is more accurate, and situation that the screenshot image includes content in non-display area because of rough operation of the user does not occur.

As shown in FIG. 11, in some embodiment, operation 11 may include following operations.

At operation S113, in response to the localization operation, the method may include determining sub-area corresponding to display control corresponding to position where the localization operation is inputted on the first screenshot image as the first target area.

In some embodiments, operation S113 may be implemented by the processor 20. That is to say, in response to the localization operation being input, the processor 20 may be configured to determine the sub-area corresponding to the display control corresponding to the position where the localization operation input in the first screenshot image as the first target area.

Figure 12:
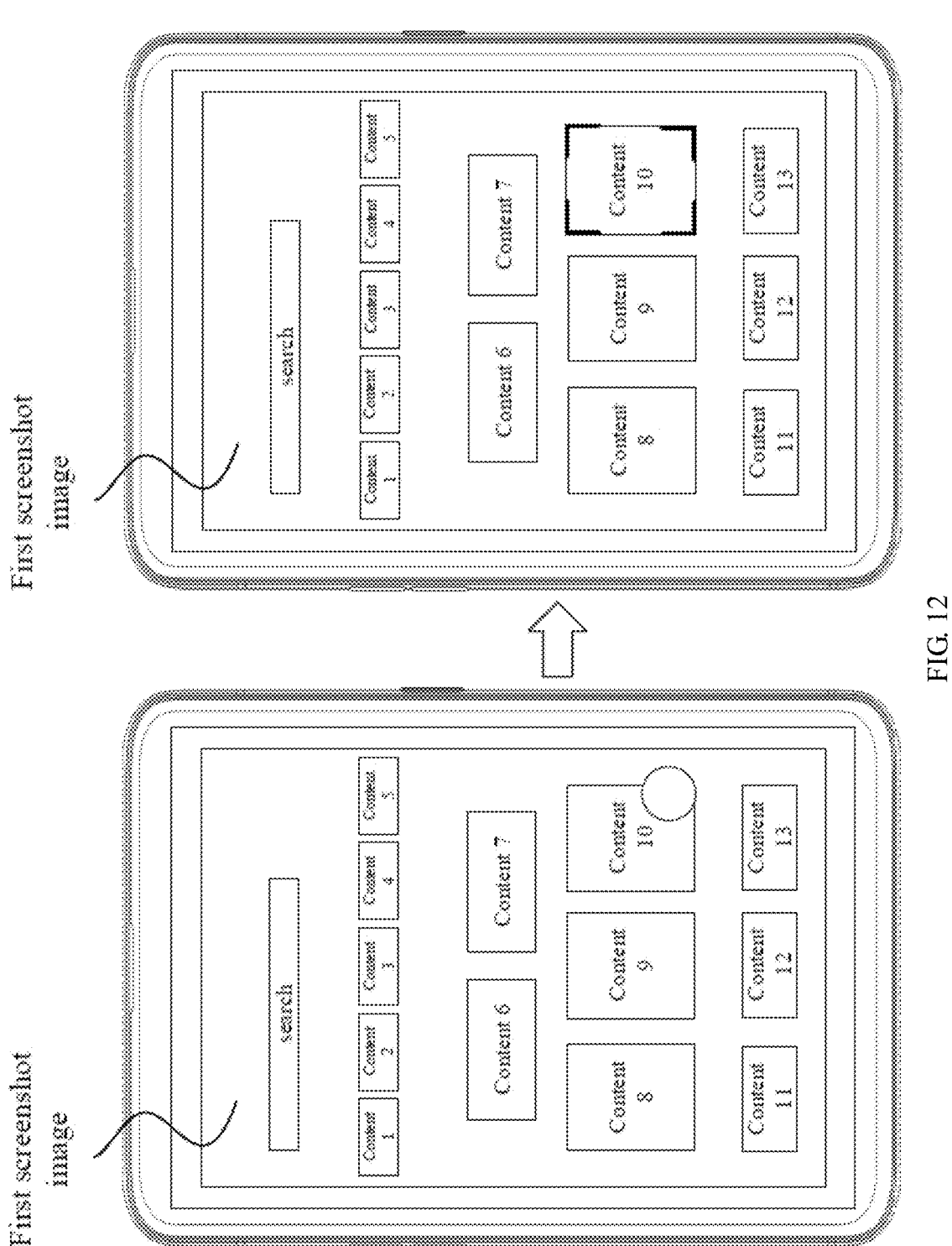
FIG. 12 is a scene schematic view of a screenshot method according to some embodiments of the present disclosure.

As shown in FIG. 12, specifically, in this embodiment, the localization operation may include long press operation by single-finger or multiple-finger, which is not limited herein. The localization operation is used to differentiate from the common click operation to avoid determining the cropping area because of the mistake trigger. The user may input the localization operation to any position of the target area in the first target screenshot image, and determine the area of the display controls according to the area of the area of the display controls relevant to the area where the localization operation is inputted, then enable the area of the area in display controls to correspond to the sub-area in the first screenshot image, thereby determining the first target area. In response to the user inputting confirm operation, the first target area in determined. The confirm operation may include long press operation by single-finger or multiple-finger, which is not limited herein. Of cause, a user interaction window may be displayed in the display interface of the first screenshot image, and the user may click ok or cancel in the user interactive window. After a selected area is determined as the first target area, area apart from the cropping area in the current interface may be performed obfuscation to highlight the cropping area.

As shown in FIG. 6, in response to the localization operation, the display controls may be set as units, the area corresponding to the all display controls may be set as the selectable state in the current state interface, such that the user can select the target screenshot interface one by one through clicking, thereby determining the final first target area. The area corresponding to the all display controls may be selected by default. Alternatively, the user may unselect the area corresponding to the all display controls through invert selection.

As shown in FIG. 7, in some embodiments, in response to the localization operation, the display controls may be set as units, the area corresponding to the all display controls may be directly set as the first target area, and the screenshot image sequence corresponding to each of the first target area may be generated, such that the user can select and stitch one or more the screenshot image to generate the final target screenshot image.

Figure 13:
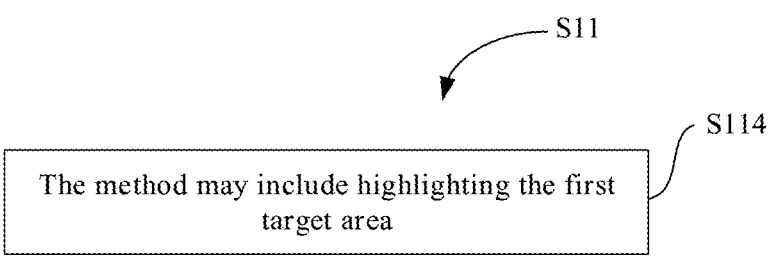
FIG. 13 is a flowchart of a screenshot method according to some embodiments of the present disclosure.

As shown in FIG. 13, in some embodiments, operation 11 may further include following operations.

At operation S114, the method may include highlighting the first target area.

In some embodiments, operation S114 may be implemented by the processor 20. That is to say, the processor 20 may be configured to highlight the first target area.

Figure 14:
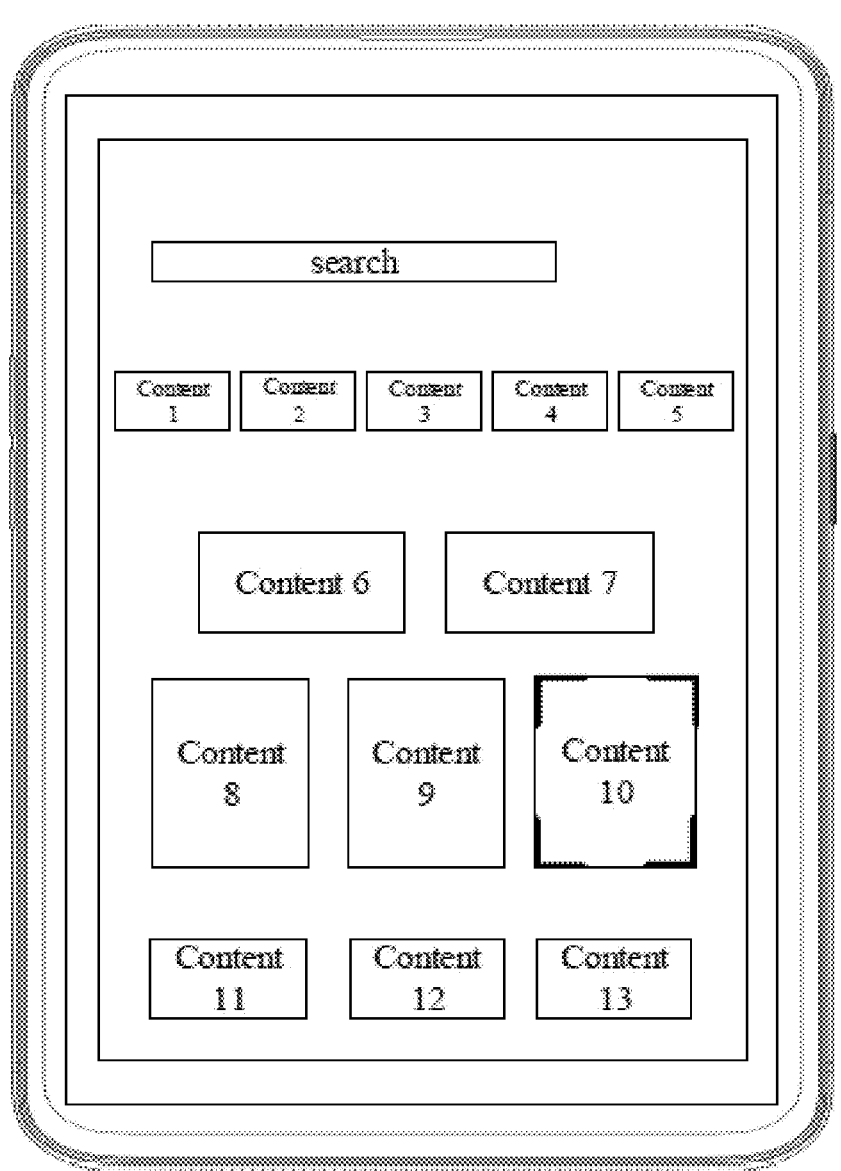
FIG. 14 is a scene schematic view of a screenshot method according to some embodiments of the present disclosure.

Specifically, as shown in FIG. 14, in response to determining the first target area according to the localization operation, the border of the first target area may notice the user in form of border line. After the user input confirmation operation, the first target area is determined. Manner of highlighting area may include and not limited to selecting the first target area according to localization box with specific color, or selecting the first target area according to box with specific dynamic effect, etc.

In this way, the user can know result selected by the localization operation, and judge whether identified first target area is right area, thereby inputting subsequent operations.

Figure 15:
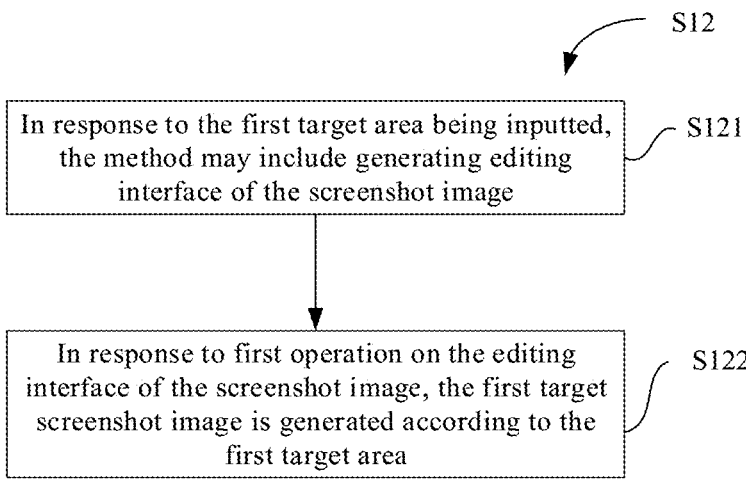
FIG. 15 is a flowchart of a screenshot method according to some embodiments of the present disclosure.

As shown in FIG. 15, in some embodiments, operation S12 may further include following operations.

At operation S121, in response to the first target area being inputted, the method may include generating editing interface of the screenshot image.

At operation S122, in response to first operation on the editing interface of the screenshot image, the first target screenshot image is generated according to the first target area.

In some embodiments, operations S121 and S122 may be implemented by the processor 20. That is to say, the processor 20 is configured to generate the editing interface of the screenshot image in response to the first operation on the first target area, and generate the first target screenshot image according to the first target area in response to first operation on the editing interface of the screenshot image.

Figure 16:
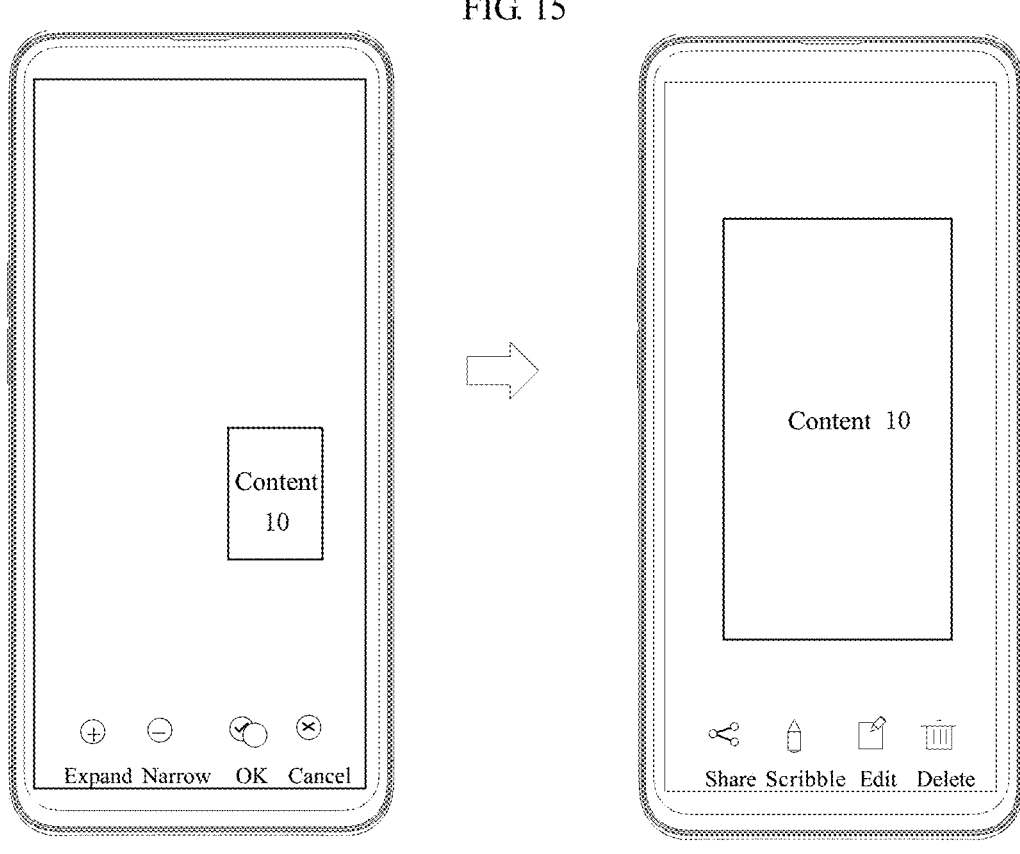
FIG. 16 is a scene schematic view of a screenshot method according to some embodiments of the present disclosure.

Specifically, as shown in FIG. 16, after the first target area is determined according to the first operation, the border of the first target area may be set to notice the user through highlighting the border box. After the user confirms the selected first target area, as the target, the user can input operation such as long press operation to the first target area to confirm the first target area. At this time, the hover state interface or the first screenshot image is cropped to the area in the first target area and the editing interface of the screenshot image is generated simultaneously. The editing interface of the screenshot image may provide a plurality of interaction options for the user to operate the first target area.

The editing interface of the screenshot image may include the plurality of interaction options. The first operation on the editing interface of the screenshot image is confirming interaction option. When the user inputs the interaction option, the first target screenshot image is generated according to the cropping area in the first target area. The first target screenshot image may be conspicuously displayed in the central position of the display interface. Simultaneously, second editable interaction option may be generated in the display interface, and the second editable interaction option may include sharing option, scribbling option, editing option, deleting option, and etc. In this way, the user can input corresponding operations to the generated first target screenshot image to improve function of cropping image and use experience.

In some embodiments, the screenshot method may include following operations.

In response to second operation on the editing interface of the screenshot image, expanding the first target area to second target area corresponding to parent control of the display controls.

In some embodiments, this operation may be implemented by the processor 20. That is to say, the processor 20 may be configured to expand the first target area to the second target area corresponding to the parent control of the display controls according to the second operation on the editing interface of the screenshot image.

Figures 17, 18:
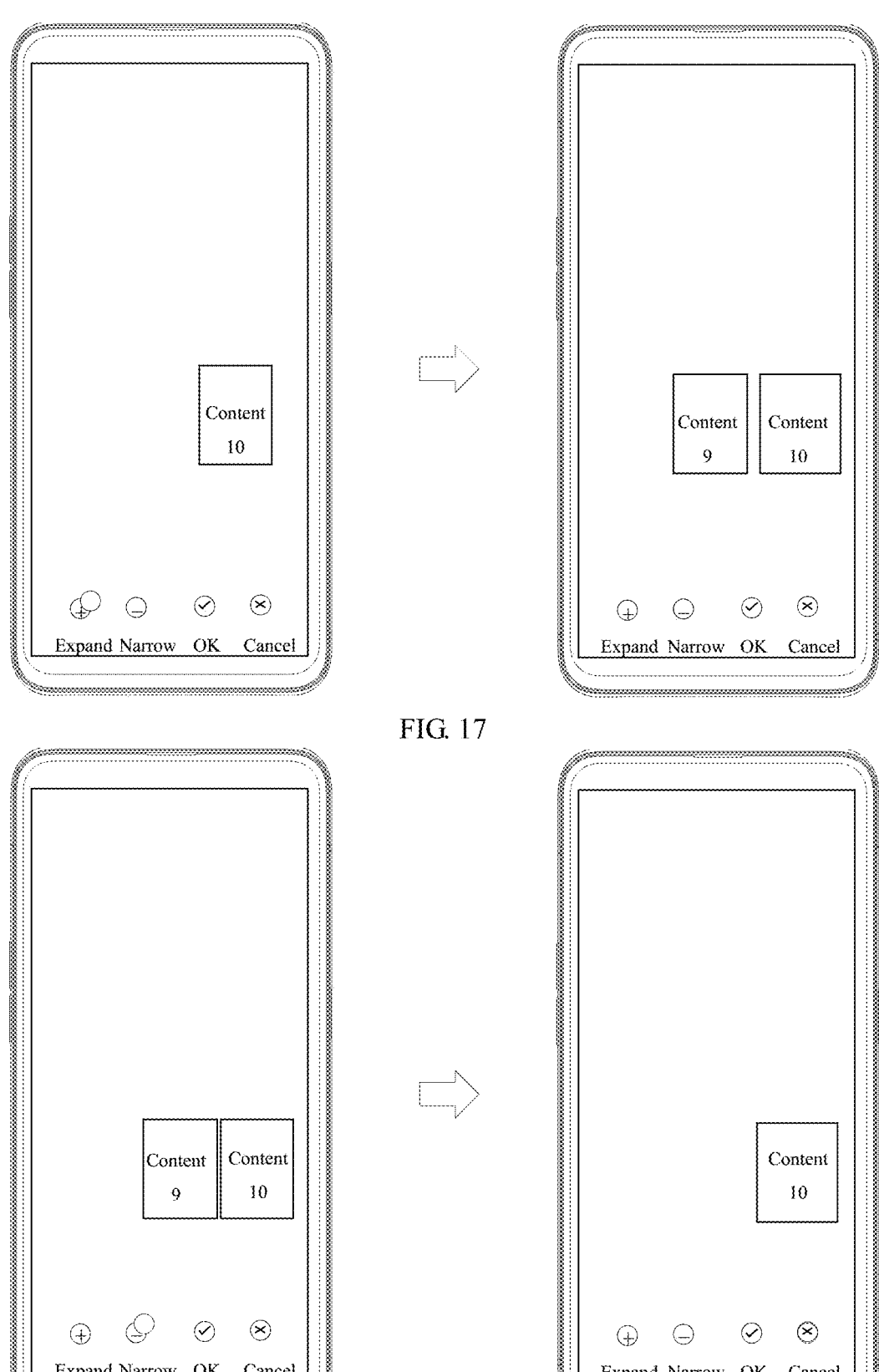
FIG. 17 is a scene schematic view of a screenshot method according to some embodiments of the present disclosure.
FIG. 18 is a scene schematic view of a screenshot method according to some embodiments of the present disclosure.

Specifically, as shown in FIG. 17, in some scenes, the target screenshot area of the user may include area corresponding to the plurality of display controls. In this situation, since the first target area is determined through the display controls being set as units, when the target screenshot interface include the plurality of display controls, the second operation need to be inputted to expand the first target area. In practical operation, the second operation may be inputted on the editing interface of the screenshot image to expand the first target area.

The editing interface of the screenshot image may include interaction option of expanding range. When the target screenshot area includes a plurality of display controls, the interaction option of expanding range is set to expand the first target area. The second operation on the editing interface of the screenshot image is inputting the interaction option of expanding range. After the user inputs the interaction option of expanding range, the display controls may be set as units to gradually expand the first target area. When this operation is implemented based on the first target area, each time the interaction option of expanding range is clicked, the first target area may be expanded to area including at least one area corresponding display control adjacent the first target area.

The parent control may be classified based on classification of the parent control. A category may be set as the parent control, and subcategory may be set as sub-control. That is to say, the parent control may include two or more display controls. In response to the user clicking the interaction option of expanding range, the first target area expands to area including the second target area corresponding to the parent control of the display controls corresponding to the first target area.

Of cause, the user may consecutively input the interaction option of expanding range, thereby expanding the first target area to area including more area corresponding to parent controls to select the target screenshot interface.

In some embodiments, the screenshot method may include following operations.

In response to third operation on the editing interface of the screenshot image, narrowing the expanded second target area to the first target area.

In some embodiments, this operation may be implemented by the processor 20. That is to say, the processor 20 may be configured to narrow the expanded second target area to the first target area according to the third operation on the editing interface of the screenshot image.

Specifically, as shown in FIG. 18, the editing interface of the screenshot image may include interaction option of narrowing range. When the target area includes a plurality of display controls, the interaction option of narrowing range is set to narrow the expanded second target area. The third operation on the editing interface of the screenshot image is inputting the interaction option of narrowing range. After the user inputs the interaction option of narrowing range, the display controls may be set as units to gradually narrow the cropping area. When this operation is implemented based on reverse order of the expanding operation, each time the interaction option of narrowing range is clicked, the second target area may be narrowed to area corresponding to the display control expect expanded area last time, until the second target area is narrowed to the first target area.

After the interaction option of expanding range and the interaction option of narrowing range being inputted, the user still needs to input confirm operation to determine final range of the first target area, thereby generating corresponding first target cropping image.

Figures 19, 20:
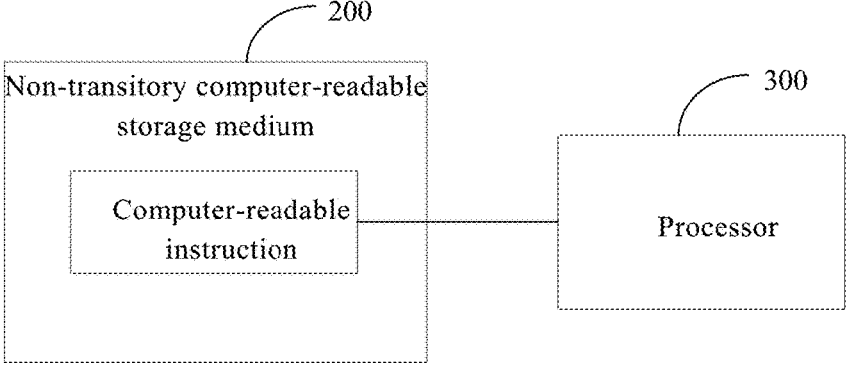
FIG. 19 is a scene schematic view of a screenshot method according to some embodiments of the present disclosure.
FIG. 20 is an interaction schematic view of a non-transitory computer-readable storage medium and a processor according to some embodiments of the present disclosure.

Further, as shown in FIG. 19, the editing interface of the screenshot image may further include canceling interaction option, i.e., giving up determining the first target area. In response to the user clicks the canceling interaction option, operation returns to last step. That is, the user may determine the first target area through inputting localization operation and the confirm operation again.

In this way, the user can input confirm operation, canceling operation, expanding operation, narrowing operation, etc. to the cropping area, such that the user may further process the first target area, thereby determining the first target area quickly and accurately.

As shown in FIG. 20, a non-transitory computer-readable storage medium 200 including computer-readable instruction is provided in the present disclosure. In response to the computer-readable instruction being implemented by a processor 300, the processor 300 implements any one of the screenshot methods in above embodiments.

For example, in response to the computer-readable instruction being implemented by a processor 300, the processor 300 may implement following operations.

In response to the start operation, the terminal enters the screenshot state. The display interface in the screenshot state may include the target screenshot interface.

In response to the localization operation on the target screenshot interface, the processor 300 is configured to determine the first target area according to the display control corresponding the localization operation inputted on the target screenshot interface.

The processor 300 is configured to generate the first target screenshot image according to the content corresponding to the first target area.

For other examples, in response to the computer-readable instruction being implemented by a processor 300, the processor 300 may implement following operations.

In response to the localization operation, the processor 300 is configured to determine the first display control according to the localization operation, and determine area where the display element corresponding to the first display control is located as the first target area.

For other examples, in response to the computer-readable instruction being implemented by a processor 300, the processor 300 may implement following operations.

In response to the start operation, the terminal enters the screenshot state.

The processor 300 is configured to generating and displaying the first screenshot image of the target screenshot interface.

For other examples, in response to the computer-readable instruction being implemented by a processor 300, the processor 300 may implement following operations.

The processor 300 is configured to extract the display controls from the target screenshot interface, and establish the corresponding relationship between the display controls and the display sub-area in the first screenshot image.

For other examples, in response to the computer-readable instruction being implemented by a processor 300, the processor 300 may implement following operations.

In response to the localization operation, the processor 300 is configured to determine the sub-area corresponding to display control corresponding to position where the localization operation inputted on the first screenshot image as the first target area.

For other examples, in response to the computer-readable instruction being implemented by a processor 300, the processor 300 may implement following operations.

The processor 300 is configured to highlight the first target area.

For other examples, in response to the computer-readable instruction being implemented by a processor 300, the processor 300 may implement following operations.

In response to the first target area being inputted, the processor 300 is configured to generate editing interface of the screenshot image.

In response to the first operation on the editing interface of the screenshot image, the first target screenshot image is generated according to the first target area.

For other examples, in response to the computer-readable instruction being implemented by a processor 300, the processor 300 may implement following operations.

In response to the second operation on the editing interface of the screenshot image, the processor 300 is configured to expand the first target area to the second target area corresponding to the parent control of the display controls. The parent control includes two or more display controls.

For other examples, in response to the computer-readable instruction being implemented by a processor 300, the processor 300 may implement following operations.

In response to the third operation on the editing interface of the screenshot image, the processor 300 is configured to narrow the expanded second target area to the first target area.

As described in the specification, referred terms such as "an embodiment", "some embodiments", "exemplary embodiment", "example", "specific example", or "some examples", etc. indicate specific features combined with embodiments or examples, structures, materials, or characteristics are included in at least one an embodiment or example. In addition, in this specification, the schematic expressions of the above terms do not necessarily refer to the same embodiments or examples. Moreover, the specific features, structures, materials or characteristics described may be combined in an appropriate manner in any one or more embodiments or examples. In addition, those skilled in the art can combine and combine different embodiments or examples described in this specification and the characteristics of different embodiments or examples without contradiction.

Any process or method described in the flowchart or otherwise described herein can be understood as representing a module, segment or part of code including one or more executable instructions for implementing the steps of a specific logic function or process, and the scope of the preferred implementation method of the present disclosure includes other implementations, which may not be in the order shown or discussed. It should be understood by those skilled in the art, the embodiment of the present disclosure that functions are executed in a basically simultaneous manner or in reverse order according to the functions involved should be subject to the protection scope of claims.

A screenshot method of the present disclosure is performed by a terminal, and includes: in response to a start operation, the terminal entering a screenshot state, a display interface of the terminal in the screenshot state including a target screenshot interface; in response to a localization operation on a target screenshot interface, determining a first target area according to a display control corresponding to the localization operation on the target screenshot interface; generating a first target screenshot image according to a content corresponding to the first target area.

In some embodiments, in the screenshot state, there is a corresponding relationship between display controls and some or all display elements in the display interface of the terminal.

In some embodiments, the in response to localization operation on the target screenshot interface, determining a first target area according to a display control corresponding to the localization operation on the target screenshot interface includes: in response to the localization operation, determining a first display control, and determining area where a display element corresponding to the first display control is located as the first target area.

In some embodiments, the screenshot method further includes: in response to the localization operation, the display controls being set as units in a hover state, setting area corresponding to the display controls as the selectable state in the current state interface, a user selecting the target screenshot interface one by one through clicking to determine the first target area; wherein the area corresponding to the display controls being selected by default; and the user unselects the area corresponding to the all display controls through invert selection.

In some embodiments, the screenshot method further includes: in response to the localization operation, the display controls being set as units in a hover state, directly setting area corresponding to the display controls as the first target area, and generating a screenshot image sequence corresponding to each of the first target area, a user selecting and stitching one or more target image to generate the target screenshot image.

In some embodiments, the in response to start operation, the terminal entering a screenshot state includes: in response to the start operation, the terminal entering the screenshot state; generating and displaying a first screenshot image in the target screenshot interface.

In some embodiments, before the in response to localization operation on a target screenshot interface, determining a first target area according to a display control corresponding to the localization operation on the target screenshot interface, the method includes: extracting display controls from the target screenshot interface, and establishing corresponding relationship between the display controls and display sub-area in a first screenshot image.

In some embodiments, the in response to localization operation on a target screenshot interface, determining a first target area according to a display control corresponding to the localization operation on the target screenshot interface includes: in response to the localization operation, determining sub-area corresponding to display controls corresponding to position where the localization operation is inputted in the first screenshot image as the first target area.

In some embodiments, after the in response to localization operation on a target screenshot interface, determining a first target area according to a display control corresponding to the localization operation on the target screenshot interface, the method includes: highlighting the first target area.

In some embodiments, the generating a first target screenshot image according to a content corresponding to the first target area includes: in response to the first target area, generating an editing interface of a screenshot image; in response to first operation on the editing interface of the screenshot image, generating the first target screenshot image according to the first target area.

In some embodiments, in response to second operation on the editing interface of the screenshot image, expanding the first target area to second target area corresponding to parent control of the display controls.

In some embodiments, the screenshot method further includes: in response to third operation on the editing interface of the screenshot image, narrowing expanded second target area to the first target area.

A terminal of the present disclosure includes a processor, and the processor is configured to: in response to a start operation, control the terminal to enter a screenshot state, a display interface of the terminal in the screenshot state including a target screenshot interface; in response to a localization operation on a target screenshot interface, determine a first target area according to a display control corresponding to the localization operation on the target screenshot interface; generate a first target screenshot image according to a content corresponding to the first target area.

In some embodiments, the processor is configured to: in response to the localization operation, determine area where a display element corresponding to the first display control is located as the first target area.

In some embodiments, the processor is configured to: in response to the start operation, control the terminal to enter the screenshot state; generate and display a first screenshot image in the target screenshot interface.

In some embodiments, the processor is configured to: extract display controls from the target screenshot interface, and establish corresponding relationship between the display controls and display sub-area in a first screenshot image.

In some embodiments, the processor is configured to: in response to the localization operation, determine sub-area corresponding to display controls corresponding to position where the localization operation inputted in the first screenshot image as the first target area.

In some embodiments, the processor is configured to: highlight the first target area.

In some embodiments, the processor is configured to: in response to the first target area being inputted, generate an editing interface of a screenshot image; in response to first operation on the editing interface of the screenshot image, generate the first target screenshot image according to the first target area.

A non-transitory computer-readable storage medium of the present disclosure includes computer-readable instruction, in response to the computer-readable instruction being implemented by a processor, the processor implements a screenshot method, the screenshot method includes: in response to a start operation, the terminal entering a screenshot state, a display interface of the terminal in the screenshot state including a target screenshot interface; in response to localization operation on the target screenshot interface, determining a first target area according to a display control corresponding to the localization operation on the target screenshot interface; and generating a first target screenshot image according to a content corresponding to the first target area.

Although the embodiments of the present disclosure have been shown and described above, it should be understood that the above embodiments are exemplary and cannot be understood as restrictions on the present disclosure. Those skilled in the art can change, modify, replace and transform the above embodiments within the scope of the present disclosure.

What is claimed is:

1. A screenshot method performed by a terminal, the screenshot method comprising:

in response to a start operation, the terminal entering a screenshot state, a display interface of the terminal in the screenshot state comprising a target screenshot interface;

generating and displaying a first screenshot image in the target screenshot interface;

in response to a localization operation on the target screenshot interface, determining a first target area according to a display control corresponding to the localization operation on the target screenshot interface, wherein the localization operation comprises a long press operation, and the first target area is identified in the target screenshot interface; and generating a first target screenshot image according to a content corresponding to the first target area;

wherein the generating a first target screenshot image according to a content corresponding to the first target area comprises:

in response to an operation on the first target area, reducing a content in the first screenshot image and cropping the first screenshot image to an image corresponding to the first target area, and generating an editing interface of a screenshot image; wherein the editing interface of a screenshot image comprises the first target area; and in response to a first operation on the editing interface of the screenshot image, generating the first target screenshot image according to the first target area;

wherein after the in response to an operation on the first target area, reducing a content in the first screenshot image and cropping the first screenshot image to an image corresponding to the first target area, and generating an editing interface of a screenshot image, the screenshot method comprises:

in response to a second operation on the editing interface of the screenshot image, expanding the first target area to a second target area corresponding to a parent control of the display control; wherein the parent control comprises at least two display controls.

2. The screenshot method as claimed in claim 1, wherein in the screenshot state, there is a corresponding relationship between display controls and some or all display elements in the display interface of the terminal.

3. The screenshot method as claimed in claim 2, wherein in response to the localization operation on the target screenshot interface, determining the first target area according to the display control corresponding to the localization operation on the target screenshot interface comprises:

in response to the localization operation, determining a first display control, and determining an area where a display element corresponding to the first display control is located as the first target area.

4. The screenshot method as claimed in claim 3, further comprising:

in response to the localization operation, the display controls being set as units in a hover state, setting an area corresponding to the display controls as a selectable state in a current state interface, a user selecting the target screenshot interface one by one through clicking to determine the first target area; wherein the area corresponding to the display controls being selected by default; and a user unselects the area corresponding to the display controls through invert selection.

5. The screenshot method as claimed in claim 3, further comprising:

in response to the localization operation, the display controls being set as units in a hover state, directly setting an area corresponding to the display controls as the first target area, and generating a screenshot image sequence corresponding to each of the first target area, a user selecting and stitching one or more target image to generate the target screenshot image.

6. The screenshot method as claimed in claim 1, before the in response to the localization operation on the target screenshot interface, determining the first target area according to the display control corresponding to the localization operation on the target screenshot interface, the screenshot method comprising:

extracting display controls from the target screenshot interface, and establishing corresponding relationship between the display controls and display sub-areas in the first screenshot image.

7. The screenshot method as claimed in claim 6, wherein in response to the localization operation on the target screenshot interface, determining the first target area according to the display control corresponding to the localization operation on the target screenshot interface comprises:

in response to the localization operation, determining a sub-area corresponding to a display control corresponding to position where the localization operation is inputted in the first screenshot image as the first target area.

8. The screenshot method as claimed in claim 1, after the in response to the localization operation on the target screenshot interface, determining the first target area according to the display control corresponding to the localization operation on the target screenshot interface, the screenshot method comprising:

highlighting the first target area.

9. The screenshot method as claimed in claim 1, further comprising:

in response to a third operation on the editing interface of the screenshot image, narrowing the second target area to the first target area.

10. A terminal comprising a processor, wherein the processor is configured to:

in response to a start operation, control the terminal to enter a screenshot state, a display interface of the terminal in the screenshot state comprising a target screenshot interface;

generate and display a first screenshot image in the target screenshot interface;

in response to a localization operation on a target screenshot interface, determine a first target area according to a display control corresponding to the localization operation on the target screenshot interface, wherein the localization operation comprises a long press operation, and the first target area is identified in the target screenshot interface; and generate a first target screenshot image according to a content corresponding to the first target area;

wherein the processor is further configured to:

in response to an operation on the first target area, reduce a content in the first screenshot image and crop the first screenshot image to an image corresponding to the first target area, and generate an editing interface of a screenshot image; wherein the editing interface of a screenshot image comprises the first target area; and in response to a first operation on the editing interface of the screenshot image, generate the first target screenshot image according to the first target area;

in response to a second operation on the editing interface of the screenshot image, expand the first target area to a second target area corresponding to a parent control of the display control; wherein the parent control comprises at least two display controls.

11. The terminal as claimed in claim 10, wherein the processor is further configured to:

in response to the localization operation, determine area where a display element corresponding to the first display control is located as the first target area.

12. The terminal as claimed in claim 10, wherein the processor is further configured to:

extract display controls from the target screenshot interface, and establish corresponding relationship between the display controls and display sub-areas in a first screenshot image.

13. The terminal as claimed in claim 12, wherein the processor is further configured to:

in response to the localization operation, determine a sub-area corresponding to a display control corresponding to position where the localization operation inputted in the first screenshot image as the first target area.

14. The terminal as claimed in claim 10, wherein the processor is configured to:

highlight the first target area.

15. A non-transitory computer-readable storage medium comprising computer-readable instruction, wherein in response to the computer-readable instruction being implemented by a processor, the processor implements a screenshot method, and the screenshot method comprises:

in response to a start operation, a terminal entering a screenshot state, a display interface of the terminal in the screenshot state comprising a target screenshot interface;

generating and displaying a first screenshot image in the target screenshot interface;

in response to localization operation on the target screenshot interface, determining a first target area according to a display control corresponding to the localization operation on the target screenshot interface, wherein the localization operation comprises a long press operation, and the first target area is identified in the target screenshot interface; and generating a first target screenshot image according to a content corresponding to the first target area;

wherein the generating a first target screenshot image according to a content corresponding to the first target area comprises:

in response to an operation on the first target area, reducing a content in the first screenshot image and cropping the first screenshot image to an image corresponding to the first target area, and generating an editing interface of a screenshot image; wherein the editing interface of a screenshot image comprises the first target area; and in response to a first operation on the editing interface of the screenshot image, generating the first target screenshot image according to the first target area;

wherein after the in response to an operation on the first target area, reducing a content in the first screenshot image and cropping the first screenshot image to an image corresponding to the first target area, and generating an editing interface of a screenshot image, the screenshot method comprises:

in response to a second operation on the editing interface of the screenshot image, expanding the first target area to a second target area corresponding to a parent control of the display control; wherein the parent control comprises at least two display controls.

* * * * *